US012715161B2

(12) United States Patent
Wachter et al.

(10) Patent No.: US 12,715,161 B2
(45) Date of Patent: Aug. 25, 2026

(54) TOOL INSERT FOR A PRIMARY SHAPING TOOL AND PRIMARY SHAPING TOOL EQUIPPED WITH SAID TOOL INSERT

(71) Applicants: Heraeus Amloy Technologies GmbH, Hanau (DE); Kunststoff-Institut für die mittelständische Wirtschaft NRW GmbH, Lüdenscheid (DE)

(72) Inventors: Hans Jürgen Wachter, Karlstein (DE); Valeska Melde, Karlstein (DE); Udo Hinzpeter, Lüdenscheid (DE)

(73) Assignees: HERAEUS AMLOY TECHNOLOGIES GMBH, Hanau (DE); KUNSTSTOFF-INSTITUT FÜR DIE MITTELSTÄNDISCHE WIRTSCHAFT NRW GMBH, Lüdenscheid (DE)

(*) Notice: Subject to any disclaimer, the term of this patent is extended or adjusted under 35 U.S.C. 154(b) by 377 days.

(21) Appl. No.: 18/558,672

(22) PCT Filed: Apr. 29, 2022

(86) PCT No.: PCT/EP2022/061457
§ 371 (c)(1),
(2) Date: Nov. 2, 2023

(87) PCT Pub. No.: WO2022/233722
PCT Pub. Date: Nov. 10, 2022

(65) Prior Publication Data

US 2024/0239023 A1 Jul. 18, 2024

(30) Foreign Application Priority Data

May 7, 2021 (EP) .................................... 21172663

(51) Int. Cl.
*B29C 33/56* (2006.01)
*B29C 33/02* (2006.01)
(Continued)

(52) U.S. Cl.
CPC .............. *B29C 33/56* (2013.01); *B29C 33/02* (2013.01); *B29C 33/046* (2013.01);
(Continued)

(58) Field of Classification Search
CPC ...................................................... B29C 33/56
See application file for complete search history.

(56) References Cited

U.S. PATENT DOCUMENTS

| | | | | |
|---|---|---|---|---|
| 5,324,473 | A | 6/1994 | Baresich | |
| 7,919,035 | B2 * | 4/2011 | Hirata | B29C 33/3828 425/111 |

(Continued)

FOREIGN PATENT DOCUMENTS

| | | | |
|---|---|---|---|
| AT | 507718 | A1 | 7/2010 |
| DE | 3621379 | A1 | 1/1988 |

(Continued)

OTHER PUBLICATIONS

Gross, et al., “Amorphe Metalle aus Titan und Schwefel”, Dec. 14, 2018.

*Primary Examiner* — Benjamin A Schiffman
(74) *Attorney, Agent, or Firm* — Panitch Schwarze Belisario & Nadel LLP

(57) ABSTRACT

The invention relates to a tool insert for a primary shaping tool, comprising a thermal insulator disposed on a main part having a molding surface contacted by the molten material to be shaped, said surface being at least partly spaced from the main part of the tool insert by a thermal insulator. The thermal insulator comprises bulk metallic glass.

20 Claims, 2 Drawing Sheets

(51) Int. Cl.

| | |
|---|---|
| ***B29C 33/04*** | (2006.01) |
| ***B29C 33/30*** | (2006.01) |
| ***B29C 43/36*** | (2006.01) |
| ***B29C 43/52*** | (2006.01) |
| ***B29C 45/16*** | (2006.01) |
| ***B29C 45/37*** | (2006.01) |
| ***B29C 45/73*** | (2006.01) |
| *B29L 31/00* | (2006.01) |

(52) U.S. Cl.

CPC ............ *B29C 33/306* (2013.01); *B29C 43/36* (2013.01); *B29C 43/52* (2013.01); *B29C 45/16* (2013.01); *B29C 45/37* (2013.01); *B29C 45/73* (2013.01); *B29C 45/7337* (2013.01); *B29C 2033/023* (2013.01); *B29C 2043/527* (2013.01); *B29C 2045/7343* (2013.01); *B29K 2905/00* (2013.01); *B29K 2905/12* (2013.01); *B29K 2995/0015* (2013.01); *B29K 2995/0039* (2013.01); *B29L 2031/757* (2013.01)

(56) References Cited

U.S. PATENT DOCUMENTS

| | | | | |
|---|---|---|---|---|
| 9,061,445 | B2 * | 6/2015 | Hinzpeter | B29C 33/06 |
| 9,499,891 | B2 * | 11/2016 | Wachter | C22C 1/02 |
| 9,579,718 | B2 * | 2/2017 | Hofmann | B22F 12/53 |
| 11,214,854 | B2 * | 1/2022 | Busch | C22C 1/11 |
| 11,318,649 | B2 * | 5/2022 | Bien | B29C 45/53 |
| 2004/0211222 | A1 * | 10/2004 | Hosoe | C23C 26/00<br>65/374.12 |
| 2011/0229595 | A1 * | 9/2011 | Krommer | B22D 17/2218<br>427/446 |
| 2017/0151609 | A1 * | 6/2017 | Elsen | B22F 3/006 |
| 2022/0118511 | A1 * | 4/2022 | Gläser | B22D 27/04 |
| 2022/0161312 | A1 * | 5/2022 | Stolpe | C22C 45/10 |

FOREIGN PATENT DOCUMENTS

| | | | | | |
|---|---|---|---|---|---|
| DE | 19735031 | A1 | | 2/1999 | |
| DE | 19918428 | C1 | * | 12/2000 | B29C 33/046 |
| DE | 202006004632 | U1 | | 6/2006 | |
| DE | 202012100504 | U1 | | 5/2013 | |
| DE | 102014223161 | A1 | | 5/2016 | |
| DE | 102021108082 | A1 | * | 10/2022 | B29C 33/02 |
| EP | 2119549 | A2 | | 11/2009 | |
| JP | 4110506 | B2 | | 7/2008 | |
| JP | 2013067168 | A | * | 4/2013 | |
| WO | 2020050851 | A1 | | 3/2020 | |

* cited by examiner

TOOL INSERT FOR A PRIMARY SHAPING TOOL AND PRIMARY SHAPING TOOL EQUIPPED WITH SAID TOOL INSERT

BACKGROUND

The subject matter of the invention is a tool insert for a primary shaping tool, comprising a thermal insulator disposed on a main part having a molding surface contacted by the molten material to be shaped, said surface being at least partly spaced from the main part of the tool insert by a thermal insulator.

When shaped parts made of thermoplastic, thermosetting or elastomer materials are injection molded, the previously plasticized material is introduced into the cavity of a primary shaping tool. The cavity of the primary shaping tool is formed by a plurality of shaping tools (tool inserts) which can be separated from each other for demolding the workpiece cooled in the cavity. The surfaces of the shaping tools that come into contact with the molding compound are referred to as molding surfaces in the context of these explanations. The image of the molding surfaces defines the surface of the workpiece. The molding accuracy on the surface of the workpiece can be affected by defects, for example, weld line notches, gloss differences or cloud and streak formation. Such surface defects can be caused by uneven contact surface temperatures of the shaping tools. The same can be observed when die casting metals.

In order to improve the molding accuracy for the plastics melt introduced into the cavity of a mold, it is known to increase the tool wall temperature—i.e., the temperature of the molding surfaces of the shaping tools—which improves the flowability of the plastics melt introduced into the cavity.

To temperature-control such shaping tools or tool inserts, they are equipped with temperature-control medium channels through which appropriately temperature-controlled fluids, for example, water or oil, are conveyed to maintain the shaping tool at a certain temperature or to heat or cool it to a certain temperature. If such shaping tools are to have a higher temperature, which deviates from the basic temperature, in certain regions, additional electrical heating cartridges or, in the case of a local temperature reduction, electrical cooling elements are disposed in recesses of the shaping tool. Shaping tools are also known in which the cooling elements ensure defined cooling of the plastics melt and thus shorten the cooling process and cycle time. For example, DE 197 35 031 A1 describes an injection molding device in which temperature elements, e.g., electric heating cartridges and also cooling elements, are introduced into recesses in the mold insert in the vicinity of critical points, which heat the mold insert during the injection phase of the plastics material, and after filling the mold cavity, the cooling elements ensure defined cooling of the plastics melt.

The basic principle of the above concepts is in each case to increase the tool wall temperature by supplying additional thermal energy. This results in additional energy costs, as well as investment costs for the required peripherals, such as heating elements and control devices.

DE 36 21 379 A1 discloses a method and a device for eliminating flow and weld line indentations in injection molded parts made of thermoplastic in that, when injection molding, the plastics melt during mold filling is kept close to the softening or crystallite melt temperature in the mold wall regions of the predeterminable flow and weld lines until mold filling is complete.

DE 20 2006 004 632 U1 describes a generic plastics primary shaping tool. In this previously known plastics primary shaping tool, at least a part of the surface of the cavity is formed by a ceramic tool insert. Due to the poor thermal conductivity of such a ceramic insert, compared to the thermal conductivity of the main part of the tool insert, which is typically produced from a tool steel, the plastics melt cools more slowly at the surface of the ceramic insert. This delays cooling of the plastics melt, which can improve certain optical properties on the surface of the plastics article to be molded, for example in the regions where flow lines or weld lines would otherwise occur.

While a wide variety of surface textures can be formed with ceramic material contact surfaces, the surface finish requirements are limited. In the region of multi-curved contours, the creation of high-gloss surfaces on ceramic materials, in contrast to metallic materials, can only be produced with a high level of technical expertise and the associated higher financial investment. Even texturing, such as graining, can only be produced to a limited extent with ceramic materials.

A tool surface with a glass-like, particularly silicate-based, coating is known from DE 10 2014 223 161 A1. This layer is an enamel or ceramic layer. The layer thickness is between 10 and 500 μm, wherein the specific thermal conductivity of the glass-like layer is preferably <5 W/mK. The formation of surface structures is not possible with such coatings, or if at all, only with a high technical effort.

To avoid the disadvantages resulting from DE 20 2006 004 632 U1, it has been proposed in DE 20 2012 100 504 U1 that the contact surface spaced from the tool block by the insulator is provided by the side of a temperature-control layer facing the cavity of the tool. The insulator is thus located below the temperature-control layer. The temperature-control layer has a thermal conductivity that is a multiple of the thermal conductivity of the insulator. The temperature-control layer is a metallic layer applied, for example, by means of an electrolytic deposition process. Thus, in this previously known plastics primary shaping tool, the surface provided by an insulator made of ceramic or polymer material and facing into the cavity of a primary shaping tool is blended by the temperature-control layer. In this manner, the plastics mass to be molded and injected into the cavity has metal contact over the entire molding surface of the tool insert, thus avoiding surface differences on the produced plastics product due to molding surfaces made of different materials and thus different molding qualities.

BRIEF SUMMARY

Based on this discussed prior art, the object of the invention is to design the structure of a tool insert, which comprises an insulator on the molding surface side at least in some regions, for a primary shaping tool, for example a plastics primary shaping tool, in such a way that it not only satisfies the requirements for delayed cooling in the region of the insulator, but also simplifies the tool insert structure while still providing a particularly high quality of molding. Furthermore, the freedom in the design of the surface design of the molding surface should be restricted as little as possible, despite the provision of insulators present on the molding surface side at least in some regions.

This object is solved by a tool insert of the type mentioned above, in which the thermal insulator comprises a bulk metallic glass.

The thermal insulator can be produced in that it consists entirely of bulk metallic glass or is produced as a composite insulator with the participation of such a material. In this concept, it is possible for the insulator, particularly if made entirely of bulk metallic glass, to form not only the actual insulator but also the material of the main part of the tool insert. In another possible embodiment, it is provided that the insulator is connected to a main part made of a different material, for example made of tool steel. In this embodiment, the thermal conductivity of the bulk metallic glass is preferably lower than the thermal conductivity of the main part of the tool insert.

According to the invention, the composition of the bulk metallic glass is not further restricted. Preferably, a bulk metallic glass means an alloy with a critical casting thickness of at least one millimeter. This means that such an alloy can solidify amorphously up to the critical casting thickness.

Bulk metallic glass (BMG) is considered to be "solid" when it reaches a critical thickness of at least 1 mm. This correlates with a crystallization nose at ~$4\times10^3$ s in the time-temperature transformation diagram (TTT diagram). This is illustrated, for example, in https://analyticalscience.wiley.com/do/10.1002/gitfach.16890/full/particularly in conjunction with Section 3.2.1 in BULKMETALLICGLASS, SC. Suryanarayana A. Inoue, CRC Press Taylor & Francis, 2011.

Bulk metallic glasses are alloys which have metallic bonding character in the solid state and at the same time an amorphous, i.e., non-crystalline phase. The alloy can be based on different elements. "Based" in this context means that the element named in each case represents the largest proportion in relation to the weight of the alloy. Components that preferably form the basis of such an alloy may be selected, for example, from:

A. metals from group IA and IIA of the periodic table, e.g., magnesium, calcium,
B. metals from Group IIIA and IVA, e.g., aluminum or gallium,
C. early transition metals from groups IVB to VIIIB, such as titanium, zirconium, hafnium, niobium, tantalum, chromium, molybdenum, manganese,
D. late transition metals from groups VIIIB, IB, IIB, such as iron, cobalt, nickel, copper, palladium, platinum, gold, silver, zinc,
E. rare earth metals, such as scandium, yttrium, terbium, lanthanum, cerium, neodymium. gadolinium and
F. non-metals, such as boron, carbon, phosphorus, silicon, germanium, sulfur.

The groups mentioned refer to the periodic table of the elements.

Preferred combinations of elements in bulk metallic glasses are selected from:

- late transition metals and nonmetals, wherein the late transition metal is the base, for example Ni—P, Pd—Si, Au—Si—Ge, Pd—Ni—Cu—P, Fe—Cr—Mo—P—C—B,
- early and late transition metals, wherein both metals may be the base, such as Zr—Cu, Zr—Ni, Ti—Ni, Zr—Cu—Ni—Al, Zr—Ti—Cu—Ni—Be,
- metals from group B with rare earth metals, wherein metal B is the base, such as Al—La, Al—Ce, Al—La—Ni—Co, La—(Al/Ga)—Cu—Ni, and
- metals from group A with late transition metals, wherein metal A is the base, such as Mg—Cu, Ca—Mg—Zn, Ca—Mg—Cu Other particularly preferred examples of alloys forming bulk metallic glasses are selected from the group consisting of Ni—Nb—Sn, Co—Fe—Ta—B, Ca—Mg—Ag—Cu, Co—Fe—B—Si—Nb, Fe—Ga—(Cr,Mo)(P,C,B), Ti—Ni—Cu—Sn, Fe—Co-Ln-B, Co—(Al,Ga)—(P,B,Si), Fe—B—Si—Nb, and Ni—(Nb,Ta)—Zr—Ti. In particular, the bulk metallic glass may be a Zr—Cu—Al—Nb alloy. Preferably, in addition to zirconium, this Zr—Cu—Al—Nb alloy comprises 23.5-24.5% by weight of copper, 3.5-4.0% by weight of aluminum, and 1.5-2.0% by weight of niobium, wherein the weight percentages add up to 100% by weight. The latter alloy is commercially available under the name AMZ4® from Heraeus Deutschland GmbH. In another particularly preferred embodiment, the bulk glass-forming alloy may contain or consist of the elements zirconium, titanium, copper, nickel, and aluminum. Another particularly suitable alloy has the composition $Zr_{52.5}Ti_5Cu_{17.9}Ni_{14.6}Al_{10}$, wherein the indices indicate mol % of the respective elements in the alloy.

In this tool insert, the thermal insulator consists of, or at least contains, a bulk metallic glass. In the latter case, for example, it may be a composite insulator in which the side facing the cavity of the primary shaping tool is formed by bulk metallic glass, while the composite partner consists of a different material, such as a ceramic.

In an embodiment in which the thermal insulator comprising a bulk metallic glass is different in material from that of the main part, in accordance with one embodiment, the alloy of the bulk metallic glass is selected to have a thermal conductivity lower than that of the main part of the tool insert, typically significantly lower than that of the main part. The tool insert or its main part of a plastics primary shaping tool is typically made of a tool steel. The tool steel has a thermal conductivity of approximately 30-46 W/mK. Thus, the selection of the alloy for producing the bulk metallic glass and thus its thermal conductivity can be used to establish the cooling delay of the molten mass introduced into the cavity at the molding surface of the tool insert. In accordance with an exemplary embodiment, the thermal conductivity of the bulk metallic glass used as an insulator is between 5 and 8 W/mK. The thermal conductivity of the bulk metallic glass is preferably lower by a factor of 8-10 than that of the main part of the tool insert. Such a difference in thermal conductivity is considered suitable in order to have to produce the insulator from bulk metallic glass with a layer thickness that is not too large and still achieve the desired cooling delay at the molding surface. Another advantage of designing the insulator as bulk metallic glass or with the participation of such a material is also that such an insulator can be produced with a relatively wide range of its layer thickness. The insulator layer thickness is preferably in the range of 0.1 cm-10 cm, particularly in the range of 0.5 cm-5 cm. This specification is not the specification of the layer thickness after the original production of the bulk metallic glass, but the layer thickness of the finished insulator, i.e., the layer thickness of the insulator as part of the tool insert.

The primary layer thickness formed by the production process can be reduced by surface machining in a subsequent step. This relatively wide range in the thickness of the bulk metallic glass can be used to establish, through the thickness of the insulator, an influence on the cooling delay of the molten mass introduced into the mold cavity at the cooling surface provided by the insulator of the tool insert to improve the surface quality of the article molded on the tool insert. The use of bulk metallic glass for the production or construction of the insulator also allows it to be formed with a varying thickness over its planar extension. Different cooling delays can be achieved in some regions via the expansion of the molding surface by such a design of the insulator with different thicknesses using one and the same insulator.

A further particular advantage of an insulator designed in this way in a tool insert is that, since it is made of metal, a surface quality can be provided on the molding surface which corresponds to that of the rest of the tool insert, should the entire molding surface of the tool insert not be provided by the insulator. Surface machining of such an insulator made of bulk metallic glass can, since it is also metal, be carried out in the same way as is known for molding surfaces of conventional tool inserts made of tool steel. In particular, surface machining, for example introducing structuring, providing a glossy or even high-gloss surface on the molding surface of the insulator, if this only makes up a partial region of the molding surface of the tool insert, can be carried out together with the remaining molding surface of the tool insert. Such machining can be carried out by cutting, for example by milling, grinding or the like. Of course, other surface machining processes are also possible. In the case of introducing structuring, it can also be a microstructuring. In contrast to ceramic insulators, when the tool insert is designed with an insulator with the participation of bulk metallic glass, disposed on a main part made of different material, for example tool steel, the coefficient of thermal expansion in the case of bulk metallic glass corresponds at least approximately to that of a tool steel used for the production of the main part, and is in any case much more similar to it than the coefficient of thermal expansion of a conventional ceramic insulator. Consequently, when such a tool insert is subjected to thermal cycling during operation of the primary shaping tool equipped with it, the occurrence of stresses that would impair the service life of the insulator in particular is reduced to a minimum. Bulk metallic glass is also characterized by relatively high elasticity, which is also advantageous for the stresses on the molding surface within the cavity of a primary shaping tool. This can come into play particularly in connection with the sometimes quite high injection pressures.

If the main part of the tool insert is also made of metal, the design of the insulator from bulk metallic glass allows for a connection of the two separately produced joining partners by clamping, form closure, bonding or similar. Optionally, the separately produced insulator can also be integrally connected to the main part. However, it is preferable to ensure that the crystallization temperature of the bulk metallic glass is not exceeded. When joining involves heat input, such as welding, this is performed in such a way that the amorphous structure of the bulk metallic glass is affected as little as possible. Laser welding along the circumference is possible, wherein the laser beam is directed at the edge region of the main part adjacent to the insulator so that material of the main part and not of the insulator—the bulk metallic glass—is predominantly melted. Due to the low thermal conductivity of the bulk metallic glass, the heat-affected zone is much smaller than that of the main part anyway.

Due to the electrical conductivity of such a bulk metallic glass, the molding surface provided by the insulator can also be directly coated with an electrodeposited anti-wear layer. For example, the anti-wear layer may have a material selected from metals, glasses, and ceramics. In particular, the anti-wear layer can be a hard chromium layer. If this is provided and the molding surface of the insulator represents only portion of the total molding surface of the tool insert, it is advisable to equip the entire molding surface of the tool insert uniformly with such an anti-wear layer. It is understood that anti-wear layers can also be formed by other means, for example by sputtering, plasma coating or similar. If the tool insert has one or more such bulk metallic glass insulators, such an anti-wear layer blends or evens out the transition from the molding surface of such an insulator to the adjacent molding surface provided by the main part of the tool insert itself, typically made of tool steel, or to an adjacent insulator. The molding surface with which the molten mass to be molded comes into contact is then homogeneous.

Such an insulator can be produced in different ways. The insulator can be produced as a separate component and then inserted as an insert in a suitably prepared recess in the main part of the tool insert on its side facing the cavity of the primary shaping tool.

If the insulator is manufactured as a separate component, the insulator can be produced, for example, by means of rapid manufacturing processes, by means of spark plasma sintering or injection molding.

The insulator can also be a formed or punched sheet, for example.

In another embodiment, the insulator may be applied directly to the main part. Suitable methods for direct deposition comprise rapid manufacturing processes, typically 3D printing, and thermal spray processes, such as cold spraying. For example, the 3D printing method can be selective laser melting (SLM) or selective laser sintering (SLS). Direct deposition is also possible directly on the tool insert when using a main part of the tool insert with sufficiently high thermal conductivity. Sufficiently high thermal conductivity is required in connection with such rapid manufacturing for rapid cooling (quenching) of the molten alloy powder. In such a rapid manufacturing process for creating the insulator, said insulator can be created with internal structures, such as cavities, particularly fluid channels or similar. Fluid channels are typically designed as capillary channels, also called microfluid channels, and are used to convey a temperature-control fluid, typically a gas such as $CO_2$, during operation of the tool insert. Depending on the design of the fluid channels and their fluid admission, this measure can influence the temperature-control of the insulator as a whole or only locally.

In a possible embodiment of the invention, a rapid method can be used to create a main part and an insulator that exhibit a material property gradient, such as a density gradient. This material property gradient can be used to adjust the thermal behavior of the tool insert.

From the group of alloys already mentioned above, a bulk metallic glass of the alloy ZrCu24Al4Nb2 is suitable for providing the insulator.

Production is carried out with a primary shaping tool using at least one such tool insert in a manner known per se. The advantages resulting from the tool insert with regard to the quality of the molding surface of the article formed in the primary shaping tool, typically a plastics article, have already been described above. It can be assumed that the reason for the special surface quality of the primary shaped article is the delayed cooling due to the insulator made with the participation of bulk metallic glass or entirely of this material. In the production of a finished plastics product or semi-finished product, a plastics melt selected from the group of materials consisting of thermoset, elastomer and thermoplastic is introduced into such a primary shaping tool with the participation of at least one tool insert according to the invention, in the case of an injection molding tool. Thermoplastics may be selected from the group consisting of semi-crystalline thermoplastics and amorphous thermoplastics. Suitable materials include polyolefins, polyacrylates, polymethacrylates, polyesters, polyethers, polycarbonates, polyamides, polystyrene and others.

After the mass, for example the plastics mass, which has been shaped into the cavity of the primary shaping tool has hardened, the tool is opened and the shaped finished or semi-finished product is removed from the cavity.

In a development of the method, after the molten mass, for example the plastics mass, introduced into the cavity has been shaped as described above, the cavity is modified in such a way that a hollow space, typically a gap, is created between the surface provided in the first step and the molding surface, into which, in a second method step, a further material is injected and is molded on the molding surface provided by the tool inserts. This gap can be only a few micrometers. The additionally injected material can be a paint, for example. Other coatings, such as soft plastics coatings, are also possible.

BRIEF DESCRIPTION OF THE SEVERAL VIEWS OF THE DRAWINGS

The invention is described below with reference to the accompanying figures using an exemplary embodiment. In the drawings.

DETAILED DESCRIPTION

Figure 1:
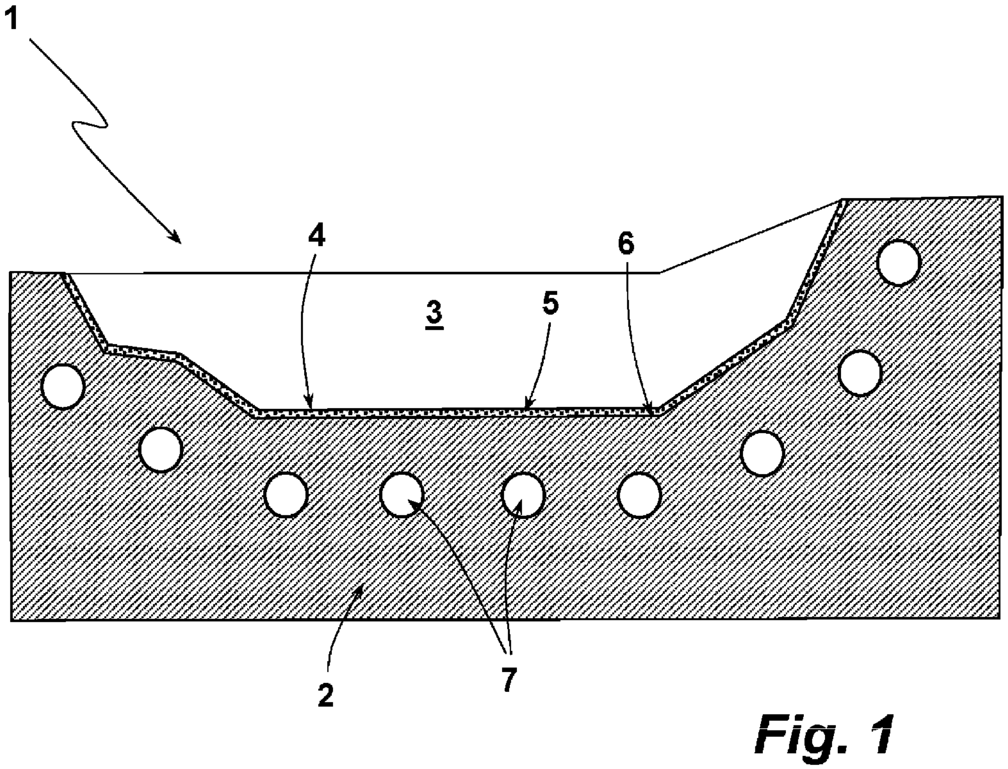
FIG. 1: shows a schematic cross-section through a tool insert of a plastics injection molding tool not otherwise shown in detail, in accordance with a first embodiment.

A tool insert 1 is used for partially enclosing a mold cavity of a plastics injection molding tool not otherwise shown in detail as a primary shaping tool described by way of example. One or more additional tool inserts are required to completely enclose the cavity. The tool insert 1 comprises a main part 2, which is made of tool steel, for example. The main part 2 has a three-dimensionally structured surface on its side facing cavity 3. The structuring shown in the figures is to be understood as exemplary. The actual molding surface 4, i.e., the surface of the tool insert 1 which is contacted by the liquid plastics mass introduced into the cavity 3, is formed in the tool insert 1 by the side of an insulator 5 made of a bulk metallic glass facing the cavity 3. In the exemplary embodiment shown, the bulk metallic glass or the insulator 5 is made in particular from the alloy ZrCu24Al4Nb7. The thickness of the insulator 5 is approximately 20 mm in the shown exemplary embodiment. In this case, the thermal conductivity of the insulator 5 made of bulk metallic glass is lower than the thermal conductivity of the main part 2 by a factor of approximately 8. Therefore, the bulk metallic glass layer can act as a thermal insulator 5, which can lead to a cooling delay of the plastics mass filled into the cavity. The insulator 5 is applied to the surface 6 of the main part 2 facing the cavity 3 by a 3D laser printing process. The insulator 5 is initially applied with a layer thickness greater than the final layer thickness of 20 mm. The actual molding surface 4 has been created by cutting in a subsequent step. The molding surface 4 is a highly polished surface in the exemplary embodiment shown.

Below the molding surface 4 of the tool insert 1, there are cavities 7 within the main part 2, in particular fluid channels for temperature-controlling tool insert 1. These can be used for heating or cooling. For temperature-control of the molding surface or the mass hardening on the molding surface 4, cavities 7, such as microfluid channels, can also be provided in the insulator 5 (not shown in the drawing). The formation of such cavities 7 is possible in a production of the insulator 5 by a rapid manufacturing method. Such cavities 7, in particular microfluid channels, can be disposed, for example, in the immediate vicinity of the molding surface 4 under so-called hotspots of the cavity 3. It is advantageous to introduce such cavities 7, in particular microfluid channels, into such an insulator 5 made of bulk metallic glass, particularly if said insulator has greater thicknesses. Such an insulator 5 can, for example, also have microfluid channels close to the molding surface and cavities 7 at a certain distance therefrom, as shown schematically in the figures in the main part there.

Figure 2:
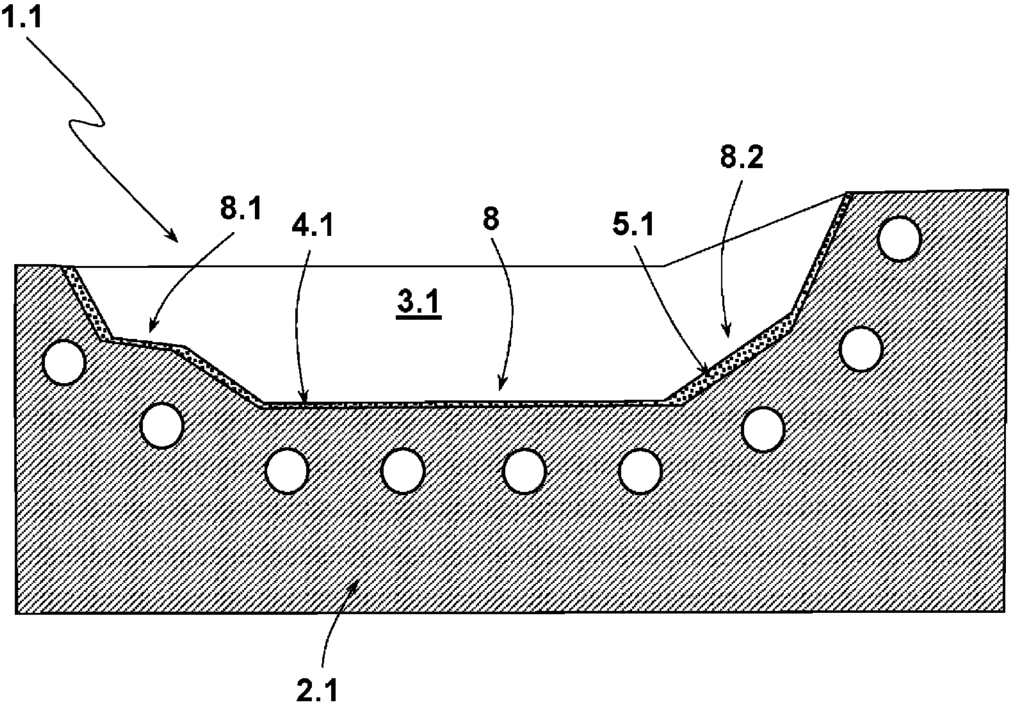
FIG. 2: shows a schematic cross-section through a tool insert of a plastics injection molding tool not otherwise shown in detail, in accordance with a further embodiment.

FIG. 2 shows another tool insert 1.1, which is basically constructed like the tool insert 1 described above. Therefore, unless otherwise described below, the relevant explanations also apply to tool insert 1.1. Identical parts are identified by the same reference numerals, supplemented by the suffix "0.1". The tool insert 1.1 differs from the tool insert 1 only in that the thickness of the insulator 5.1 is different over its planar extension. Said planar extension is thinner in portions 8, 8.1 than in the other portions of this insulator 5.1. In the portion 8.2, the insulator 5.1 has its greatest layer thickness. The layer thickness of the insulator 5 in the form of a bulk metallic glass layer is preferably responsible for the cooling retardation desired at the molding surface 4.1. Ideally, the thicker this insulator 5.1 is, the greater the cooling delay or the heat buildup provided at this portion of the molding surface 4.1 by the insulator 5.1. The insulator 5.1 has been produced in the same way as is described for the insulator 5 of the exemplary embodiment of FIG. 1.

Figure 3:
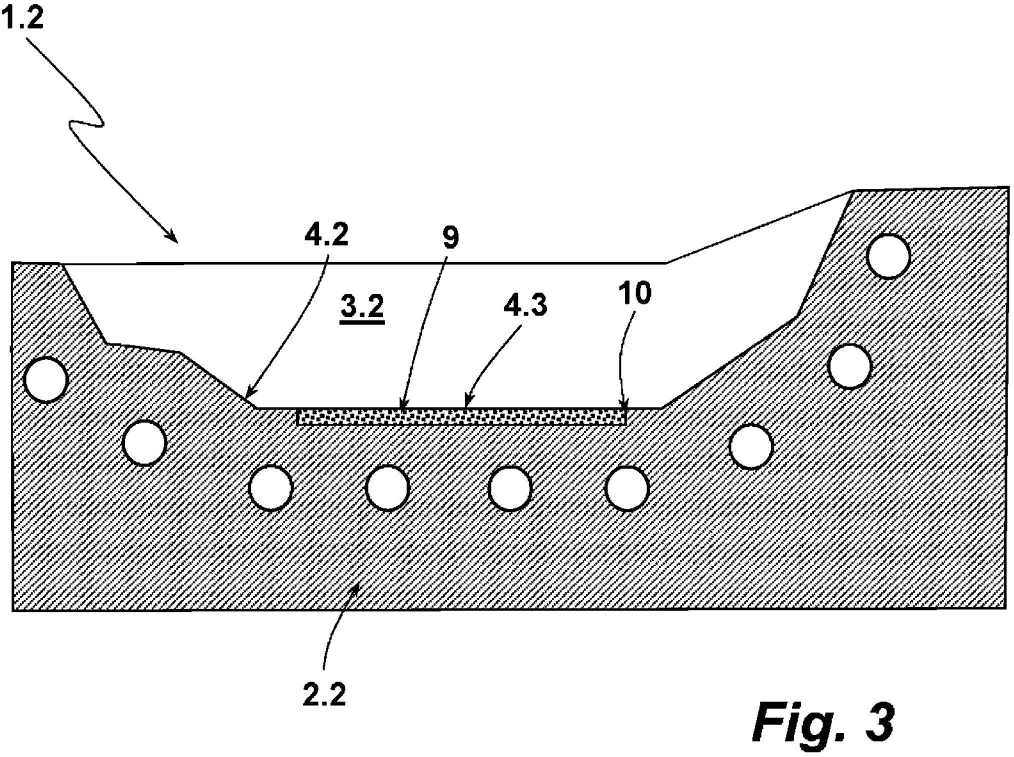
FIG. 3: shows a schematic cross-section through a tool insert of a plastics injection molding tool not otherwise shown in detail, in accordance with yet another embodiment.

FIG. 3 shows yet another tool insert 1.2. Identical parts are also identified by the same reference numerals, supplemented by the suffix "0.2". The tool insert 1.2 has a molding surface 4.2, which is formed partly by the main part 2.2 and partly by the corresponding surface 4.3 of an insulator 9 made of bulk metallic glass and designed as an insert. The insulator 9 is produced separately and subsequently inserted into a prepared recess 10, introduced into the molding surface 4.2 of the main part 2.2, and connected to it, for example by laser welding along the circumference of the insulator 9.

All of the described exemplary embodiments may be coated with an anti-wear layer, such as a hard chrome layer, if desired.

The invention has been described using exemplary embodiments. Without departing from the scope of the applicable claims, there are numerous further possibilities for a person skilled in the art to implement them, without, however, having to explain this in detail within the scope of the present embodiments.

The invention claimed is:

1. A tool insert for a primary shaping tool, comprising a thermal insulator disposed on a main part having a molding surface contacted by a molten material to be shaped, said surface being at least partly spaced from the main part of the tool insert by a thermal insulator, wherein the thermal insulator comprises bulk metallic glass and has a thickness in the range of 0.5 cm-5 cm.

2. The tool insert according to claim 1, wherein the main part comprises the same material as the insulator or a material different from the insulator.

3. The tool insert according to claim 2, wherein the main part comprises a tool steel.

4. The tool insert according to claim 1, wherein the molding surface of the tool insert or at least a region of the molding surface is formed by the insulator itself.

5. The tool insert according to claim 1, wherein, at least in a region of the insulator, an anti-wear layer is disposed on the insulator.

6. The tool insert according to claim 1, wherein the thickness of the insulator is at least largely constant over its planar extension.

7. The tool insert according to claim 1, wherein the thickness of the insulator varies over its planar extension to provide molding surface regions which are temperature-controlled at different rates.

8. The tool insert according to claim 1, wherein cavities are provided within the insulator and/or the main part.

9. The tool insert according to claim 8, wherein the cavities are fluid channels for conveying a temperature-control fluid.

10. The tool insert according to claim 1, wherein the insulator is integrally applied to a material of the main part or to an insert introduced therein.

11. The tool insert according to claim 10, wherein the insulator is integrally applied by a rapid manufacturing method to the material of the main part or to an insert introduced therein.

12. The tool insert according to claim 1, wherein the bulk metallic glass is an alloy which is based on an element selected from the group consisting of Co, Fe, Ti, Zr, Cu, Au, Pt and Mg.

13. The tool insert according to claim 12, wherein the bulk metallic glass is an alloy containing Zr and Cu.

14. The tool insert according to claim 1, wherein a surface of the insulator facing away from the main part is machined after production.

15. The tool insert according to claim 14, wherein the surface of the insulator facing away from the main part is machined after production by means of polishing, grinding, eroding or milling.

16. The tool insert according to claim 1, wherein the tool insert is a tool insert for a plastics injection molding tool.

17. A primary shaping tool comprising at least one cavity enclosed by at least two tool inserts, wherein at least one of said tool inserts is a tool insert according to claim 1.

18. The primary shaping tool according to claim 17, wherein the primary shaping tool is a plastics primary shaping tool.

19. A method for producing a plastics part by primary shaping, in particular injection or compression molding, using a tool insert according to claim 1 or using the primary shaping tool, wherein a molten plastics mass, which is selected from the group consisting of thermosets, elastomers and thermoplastics, is introduced into the cavity.

20. The method according to claim 19, wherein, after the shaped part has been primary-shaped, a further cavity is created between the shaped part and the tool insert, and a further material is injected into this further cavity.

* * * * *